United States Patent
Alexander (10) Patent No.: US 10,080,362 B1
(45) Date of Patent: Sep. 25, 2018

(54) TREESTAND PLATFORM ADJUSTMENT MECHANISM

(71) Applicant: Millennium Outdoors, LLC, Pearl, MS (US)

(72) Inventor: Bill W. Alexander, Pearl, MS (US)

(73) Assignee: MILLENNIUM OUTDOORS, LLC, Pearl, MS (US)

( * ) Notice: Subject to any disclaimer, the term of this patent is extended or adjusted under 35 U.S.C. 154(b) by 0 days.

(21) Appl. No.: 14/924,276

(22) Filed: Oct. 27, 2015

(51) Int. Cl.
*A01M 31/02* (2006.01)
*A47C 9/10* (2006.01)

(52) U.S. Cl.
CPC .............. *A01M 31/02* (2013.01); *A47C 9/10* (2013.01)

(58) Field of Classification Search
CPC .................................................. A01M 31/02
See application file for complete search history.

(56) References Cited

U.S. PATENT DOCUMENTS

| | | | | |
|---|---|---|---|---|
| 725,808 A | * | 4/1903 | Weidner | A47B 39/00 248/297.31 |
| 1,299,176 A | * | 4/1919 | Hadler | A47B 57/56 248/245 |
| 2,342,427 A | * | 2/1944 | Riblet | E04G 5/06 248/246 |
| 6,126,127 A | * | 10/2000 | Riblet | E04G 5/06 248/219.4 |
| 6,273,381 B1 | * | 8/2001 | Riblet | E04G 5/06 248/235 |
| 6,367,585 B1 | * | 4/2002 | Fast | A01M 31/02 182/135 |
| 2010/0300808 A1 | * | 12/2010 | Hale | A01M 31/02 182/187 |

* cited by examiner

*Primary Examiner* — Alvin Constantine Chin-Shue
(74) *Attorney, Agent, or Firm* — Angela Holt; Bradley Arant Boult Cummings LLP (57) ABSTRACT

A treestand platform adjustment mechanism adjusts the angle of a treestand platform with respect to a vertical support. The treestand's vertical support extends between a seat and a platform, the platform extending generally perpendicularly from the support, the support generally aligned with a tree. The support comprises openings extending through a tree-facing side of the support. A captive bracket substantially surrounds the support. A fixing bolt extends through the captive bracket and is received by the openings to set the position of the platform with respect to the support.

20 Claims, 7 Drawing Sheets

TREESTAND PLATFORM ADJUSTMENT MECHANISM

BACKGROUND AND SUMMARY

Treestand platforms need to be adjustable rotationally with respect to the trees they are attached to. This adjustment has generally been done with plungers or pins that a user has to put in and take out. Plungers often have springs that can rust and break. Other adjustment mechanisms are detachable from the treestand and can fall off or be lost.

A treestand platform adjustment mechanism of the present disclosure has no moving parts, and is captive to the treestand so that it cannot fall off. The mechanism allows the user to easily adjust the angle of the platform by rocking a captive bracket backwards, sliding it to the desired spot, and locking it in place.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

The disclosure can be better understood with reference to the following drawings. The elements of the drawings are not necessarily to scale, emphasis instead being placed upon clearly illustrating the principles of the disclosure. Furthermore, like reference numerals designate corresponding parts throughout the several views.

DETAILED DESCRIPTION

Figure 1:
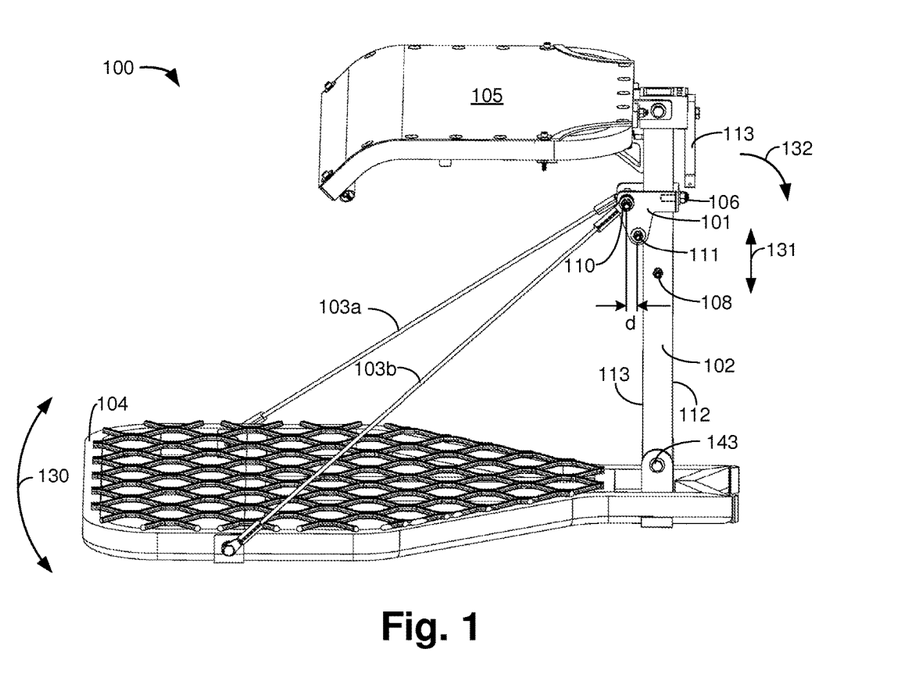
FIG. 1 is a side perspective view of a treestand with a platform adjustment mechanism according to an exemplary embodiment of the present disclosure.

FIG. 1 is a side perspective view of a treestand 100. The treestand 100 comprises a platform 104 rotatably affixed to a generally vertical support 102. The support 102 is affixed to a tree (not shown) via a vertical support bar 113 that is received by a bracket (not shown) affixed to a tree support (not shown). The attachment of the treestand 100 to the tree is discussed in U.S. Pat. No. 7,174,995 titled "Collapsible Tree Stand," which is incorporated herein by reference in its entirety.

Support cables 103a and 103b extend from opposed sides of the platform 104 to a captive bracket 101 that is movably affixed to the vertical support 102. The support cables 103a and 103b support the platform 104, which would otherwise rotate with respect to the support 102 via a pin 143. The platform 104 can be rotationally adjusted with respect to the support 102 by moving the captive bracket 101 upwards or downwards, as further discussed herein.

A seat 105 is disposed near a top of the support 102 as shown. In this regard, a user (not shown) can stand on the platform 104 or sit on the seat 105, with his or her feet on the platform 104. The platform 104 extends from the support 102 generally perpendicularly to the support, though the angle between the platform 104 and the support 102 is changeable using the method of adjusting the captive bracket 101 discussed herein. In one embodiment, the platform adjusts approximately three (3) degrees up from the horizontal and twelve (12) degrees down. In other embodiments, the angle of adjustment may be more or less.

The support 102 has a generally rectangular cross section with a tree-facing side 112 opposing an outer side 113. A plurality of openings (not shown) extending through the tree-facing side 112 of the support 102 receive a fixing bolt 106 that extends inwardly from the captive bracket 101, as further discussed herein.

The captive bracket 101 comprises a generally U-shaped bracket, with it an open edge facing away from the tree (not shown). A top transverse bolt 110 extends between opposed edges of the bracket 101 and causes the bracket 101 to fully enclose the support 102. A bottom transverse bolt 111 also extends between opposed edges of the bracket, but lower on the bracket and inwardly (toward the tree-facing side 112) from the top transverse bracket, as shown. In this regard, the bottom transverse bolt 111 is offset from the top transverse bolt 110 a distance "d" in the horizontal direction. This difference in the placement of the top transverse bolt 110 and the bottom transverse bolt 111 is important to the operation of adjusting the bracket, as further discussed herein.

A tree-side fixing bolt 106 extends inwardly from the tree-facing side of the bracket 101, and extends into openings (not shown) on the tree-facing side 112 of the support 102. The tree-side fixing bolt 106 extending into the openings secures the bracket 101 in place to set the position of the platform 104 with respect to the support 102. In this regard, the platform 104 would rotate in the direction indicated by directional arrow 130 (around pin 143) if the captive bracket 101 was not secured to the support 102 (via the fixing bolt 106 extending into the openings in the support 102). When the captive bracket 101 is secured to the support 102, the cables 103a and 103b are taught and support the platform 104 in a stable position.

In order to move the captive bracket 101 to a different position along the support (i.e., in order to adjust the captive bracket 101 to adjust the platform 104), the user (not shown) rotates the captive bracket 101 backwards (towards the tree) in the direction indicated by directional arrow 143 until the fixing bolt 106 comes out of the openings in the support 102. During this rotation, the lower transverse bolt 111 generally contacts the outer surface 113 of the support and the captive bracket 101 can rotate around the lower transverse bolt 111 until the upper transverse bolt 110 contacts the outer side 113 of the support.

Rotating the captive bracket 101 in this manner causes the fixing bolt 106 to come out from the opening (not shown) in the tree-facing side 112 of the support 102 so that the captive bracket 101 can then be moved up or down in the direction indicated by directional arrow 131 (i.e., the bracket 101 slides along the support 102, parallel to the longitudinal axis of the support 102). When the bracket 101 is in the desired position (i.e., when the platform 104 is at the desired angle), the user rotates the captive bracket 101 in the opposite direction (opposite from that indicated by directional arrow 132) such that the fixing bolt 106 passes through the desired opening, re-securing the bracket 101 into the support 102.

A stop bolt 108 extends from opposed sides of the support 102 and prevents the captive bracket 101 from being moved down the support 102 past the stop bolt 108. The bracket 101 is considered "captive" because it cannot fall from the treestand 100 and can only be removed by removing the bolts 110 and 111. The bracket 101 cannot therefore be accidentally lost in normal operation of the treestand 100.

Figure 2:
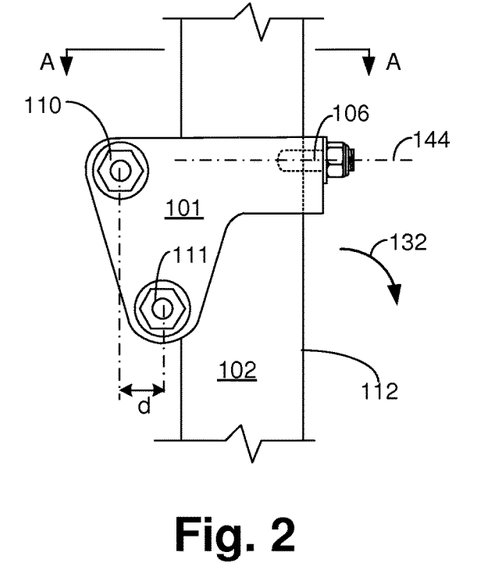
FIG. 2 is an enlarged simplified view of a captive bracket and vertical support according to an exemplary embodiment of the present disclosure.

FIG. 2 is an enlarged simplified view of the captive bracket 101 and support 102 of FIG. 1. In this embodiment, the fixing bolt 106 is generally in the same horizontal plane (represented in two dimensions as reference line 144 in FIG. 2) as the top transverse bolt 110 when the bracket is in this position. The bolt 111 is lower than the bolts 110 and 106, and as discussed above, the bolt 111 is spaced inwardly from the bolt 110 by a distance "d."

The fixing bolt 106 extends through the opening (not shown) in the tree-facing side 112 of the support 102. To move the captive bracket 101, the user rotates the bracket 101 in the direction indicated by directional arrow 132, as discussed above, until the fixing bolt 106 comes out of the opening in the support 102. Then the bracket 101 can be slid along the support until it is in the desired position.

Figure 3:
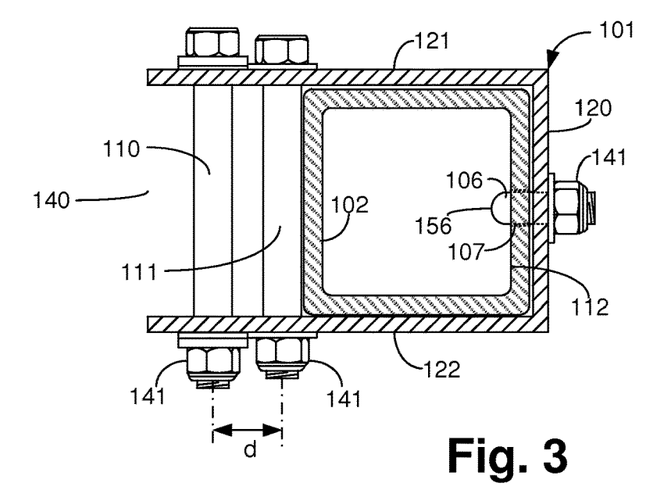
FIG. 3 is a cross-sectional view of the captive bracket and support of FIG. 2, taken along section lines A-A of FIG. 2.

FIG. 3 is an enlarged cross-sectional view of the support 102 and captive bracket 101 of FIG. 2, taken along section lines A-A of FIG. 1. The captive bracket 101 comprises a general U-shape as shown, with a rear side 120 flanked by opposed sides 121 and 122. The rear side 120 of the captive bracket 101 is adjacent to the tree-facing side 112 of the support 102. An open side 140 of the captive bracket 101 is enclosed by the upper transverse bolt 110 and the lower transverse bolt 111. The upper transverse bolt 110 and the lower transverse bolt 111 each extend between opposed sides 121 and 122, and both bolts 110 and 111 close off the open side 140 of the U-shaped bracket 101 to cause the bracket 101 to completely enclose the support 102.

The fixing bolt 106 extends through the rear side 120 of the captive bracket 101 and into an opening 107 on the tree-facing side 112 of the support 102 to secure the captive bracket 101 to the support 102. The bolts 106, 110 and 111 are secured by standard nuts 101 in the illustrated embodiment. In some embodiments, the fixing bolt 106 may comprise a pin welded to the rear side 120 of the captive bracket 101, instead of a bolt secured by a nut 101.

An innermost end 156 of the fixing bolt 106 is rounded (i.e., has a radius), to help ease it into the opening 107.

The upper transverse bolt 110 is offset from the lower transverse bolt 111 a distance "d" as shown, in the horizontal direction. This offset allows the user to rotate the bracket 101 essentially around the lower transverse bolt 111 until the fixing bolt 106 slips from the opening 107, as shown in FIGS. 4 and 5.

Figure 4:
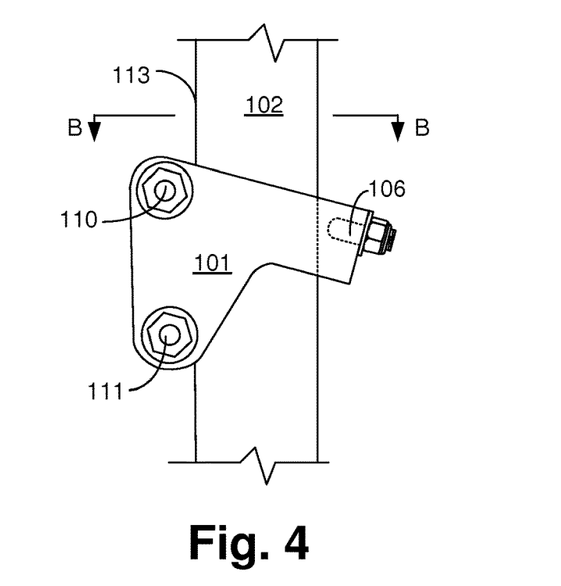
FIG. 4 is an enlarged simplified view of a captive bracket and vertical support as shown in FIG. 2, rotated from the orientation shown in FIG. 2.

FIG. 4 is an enlarged simplified view of a captive bracket 101 and vertical support 102 as shown in FIG. 2, rotated from the orientation shown in FIG. 2 until the fixing bolt 106 comes out of the opening 107 (FIG. 3) in the support 102, thus enabling the bracket 101 to be moved. Note that when the bracket 101 is rotated in this manner, the upper transverse bolt 110 is moved toward the support 102, such that the upper transverse bolt 110 generally aligns vertically with the lower transverse bolt 111. Both the upper transverse bolt 110 and the lower transverse bolt 111 may contact the outer side 113 of the support 102 while the captive bracket 101 is slid into a new position on the support 102.

Figure 5:
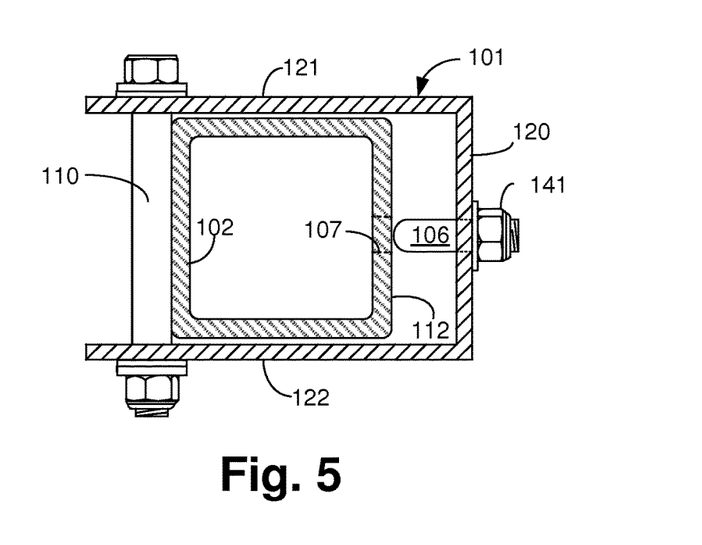
FIG. 5 is a cross-sectional view of the captive bracket and support of FIG. 4, taken along section lines B-B of FIG. 4.

FIG. 5 is a cross-sectional view of the captive bracket and support of FIG. 4, taken along section lines B-B of FIG. 4. The captive bracket 101 has been rotated with respect to the support 102 until the fixing bolt 106 has come out of the opening 107 in the support 102, freeing the captive bracket 101 to slide along the support 102.

Figure 6:
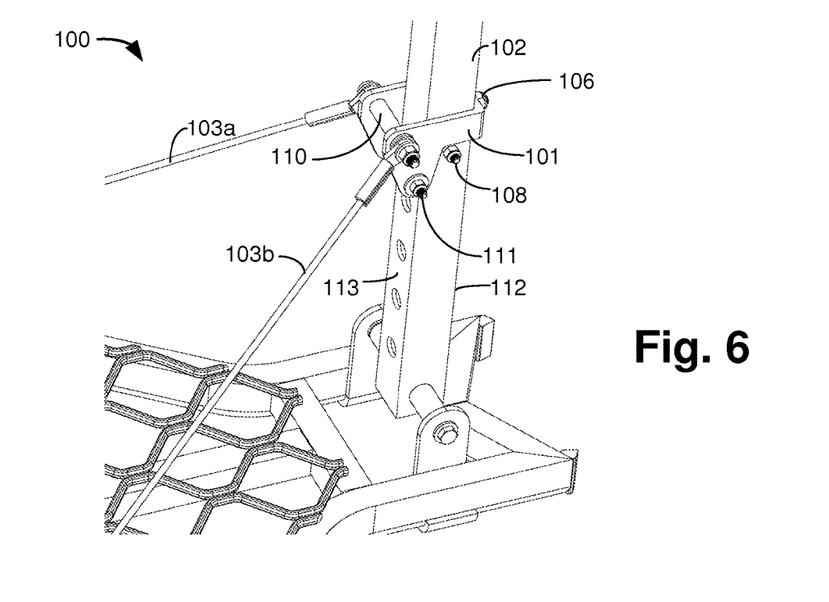
FIG. 6 is an enlarged partial perspective view of the captive bracket shown in FIG. 1.

FIG. 6 is an enlarged partial perspective view of the treestand 100 of FIG. 1, showing the captive bracket 101 resting against the stop bolt 108 when the bracket 101 has been moved downward along the support 102 as far as it will travel. The stop bolt 108 extending from the support 102 prevents the bracket 101 to slide below the stop bolt 108.

Figure 7:
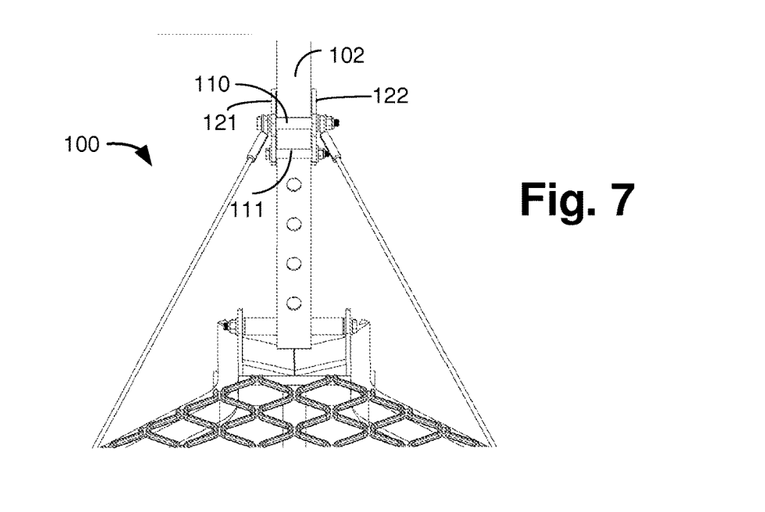
FIG. 7 is a rear perspective view of the treestand of FIG. 1.

FIG. 7 is an enlarged partial view of the treestand 100 of FIG. 1, showing the upper transverse bolt 110 and the lower transverse bolt 111 extending between the sides 121 and 122 of the bracket 101, completely enclosing the support 102.

Figure 8:
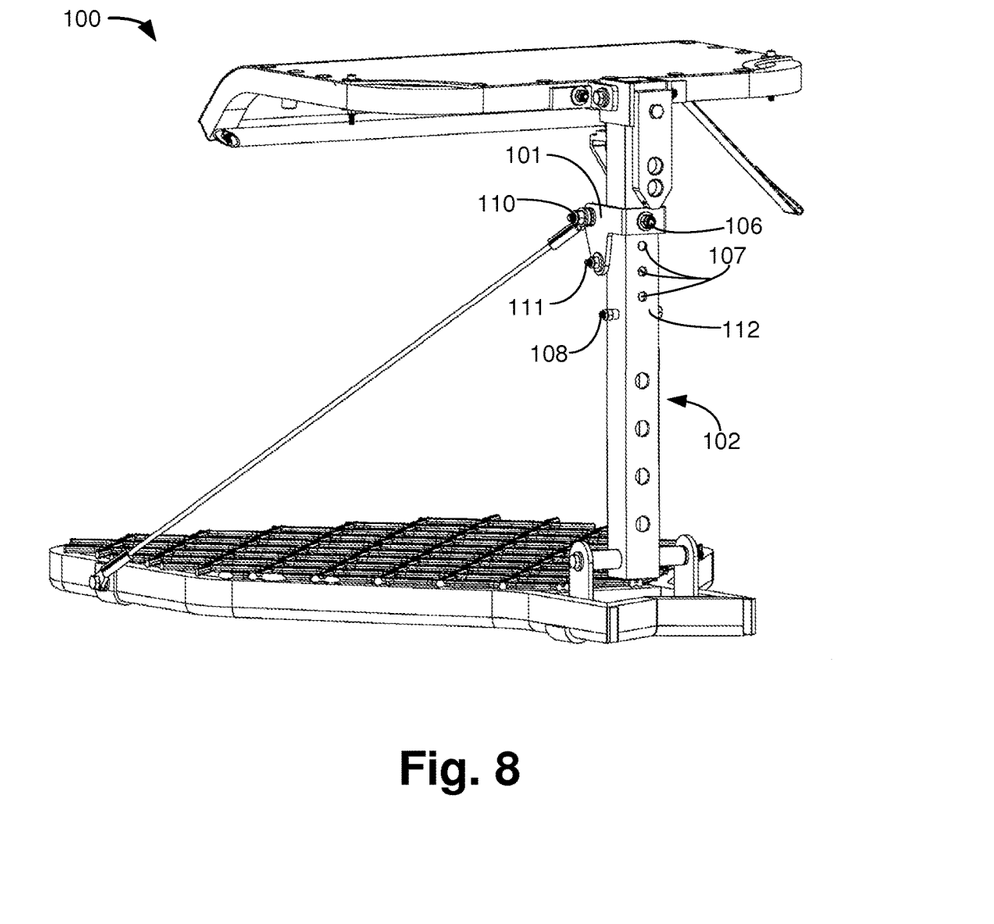
FIG. 8 is an enlarged rear perspective view of the captive bracket shown in FIG. 1.

FIG. 8 is a rear perspective view of the treestand 100 of FIG. 1, showing the plurality of openings 107 in the tree-facing side 112 of the support 102. Each of the plurality of openings 107 can receive the fixing bolt 106, by moving the captive bracket 101 as discussed herein.

Figure 9:
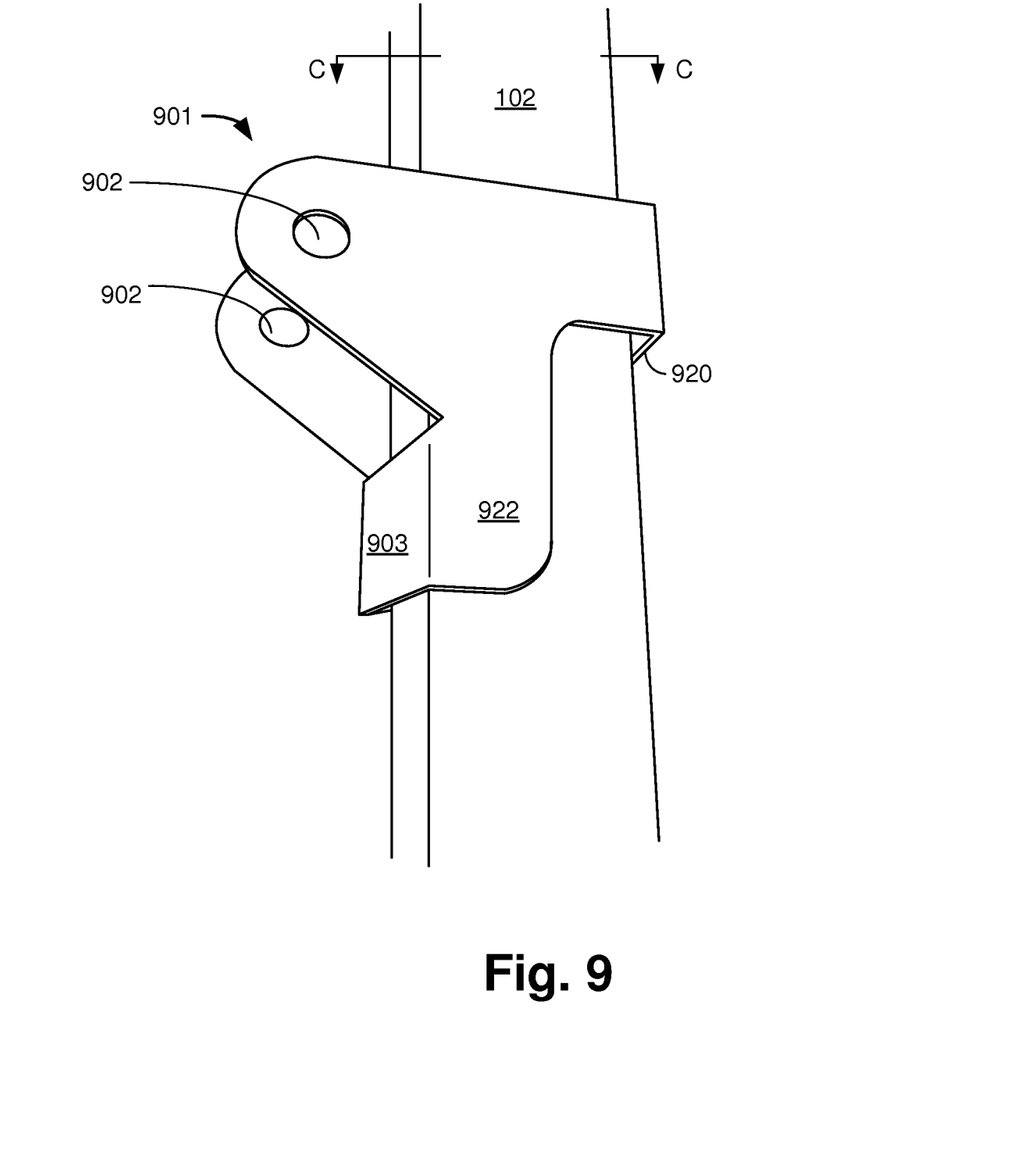
FIG. 9 is a perspective view of an alternative embodiment of a captive bracket according to an exemplary embodiment of the present disclosure.

FIG. 9 is a perspective view of an alternative embodiment of a captive bracket 901 according to the present disclosure. In this embodiment the bracket 901 comprises a bottom bar 903 extending between opposed sides 922 and 921 (FIG. 10) of the bracket 901. The bottom bar replaces the bottom transverse bolt 111 in the embodiment of FIG. 1. A top transverse bolt (not shown) extends between opposed sides of the bracket 901 and is received by openings 902 in the opposed sides. A fixing pin (not shown) welded to a rear side 920 of the bracket 901 replaces the fixing bolt 106 of FIG. 1.

Figure 10:
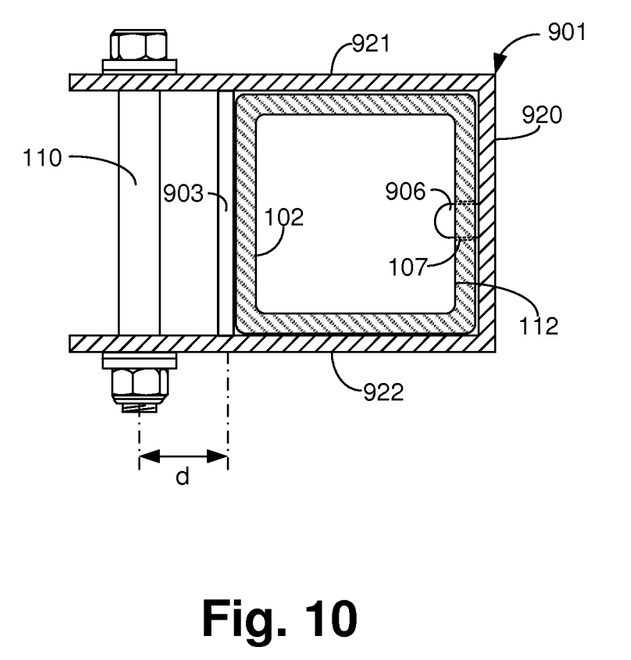
FIG. 10 is a cross-sectional view of the captive bracket and support of FIG. 9, taken along section lines C-C of FIG. 9.

FIG. 10 is a cross-sectional view of the captive bracket 901 and support 102 of FIG. 9, taken along section lines "C-C" of FIG. 9. In this embodiment, the bottom bar 903 of the captive bracket 901 closes off the inner side of the bracket 901. The top transverse bolt 110 extends between opposed sides 921 and 922 of the bracket 901. In other embodiments, the top transverse bolt 110 may be replaced with a solid bar in the same manner that the bottom bar 903 replaced the bottom transverse bolt 110 in the embodiment of FIG. 1.

A tree-side fixing pin 906 extends inwardly from the tree-facing side of the bracket 901, and extends into one of the plurality of openings 107 on the tree-facing side 112 of the support 102. The tree-side fixing pin 907 extending into the openings 107 secures the bracket 901 in place to set the position of the platform 104 (FIG. 1) with respect to the support 102. In this embodiment, the fixing pin 906 is welded to the captive bracket 901.

The invention claimed is:
1. A treestand platform adjustment mechanism coupled to and in combination with a tree, for adjustably angling a platform in relation to the tree, comprising:
a substantially vertical support rotatably affixed to a platform, the support comprising a plurality of openings extending generally horizontally through the support, the openings vertically spaced-apart from one another on a tree-facing side of the support, the tree-facing side of the support facing the tree;

a captive bracket substantially surrounding the support, the captive bracket comprising a fixing bolt extending inwardly from a tree-facing side of the captive bracket, the fixing bolt receivable by each of the plurality of openings, the fixing bolt setting a position of the platform with respect to the vertical support.

2. The mechanism of claim 1, the support comprising a generally rectangular cross section, with an outer side opposed from the tree-facing side and right and left sides.

3. The mechanism of claim 1, the captive bracket comprising a substantially U-shaped bracket with an open end enclosed by an upper transverse bolt and a lower transverse bolt, the upper transverse bolt and the lower transverse bolt each extending between opposed sides of the bracket.

4. The mechanism of claim 3, the lower transverse bolt spaced inwardly from the upper transverse bolt.

5. The mechanism of claim 4, the lower transverse bolt spaced below the upper transverse bolt.

6. The mechanism of claim 5, the fixing bolt and the upper transverse bolt lying in the same general horizontal plane.

7. The mechanism of claim 1, the captive bracket configured such that it is adjustable on the support by rocking the captive bracket downward and towards the tree until the fixing bolt is removed from the support, then sliding the bracket upwards or downwards on the support.

8. The mechanism of claim 1, further comprising support cables extending between the platform and the captive bracket.

9. The mechanism of claim 8, the support cables comprising two cables, the cables extending between opposed ends of the upper transverse bolt and opposed sides of the platform.

10. A treestand platform adjustment mechanism coupled to and in combination with a tree, for adjustably angling a platform in relation to the tree, the mechanism comprising:

a support rotatably affixed to a platform, an angle between the support and the platform adjustable by adjusting a captive bracket that is slideably engaged with the support, the support comprising a plurality of openings extending generally horizontally through the support, the openings vertically spaced-apart from one another on a tree-facing side of the support, the tree-facing side of the support facing the tree;

the captive bracket substantially surrounding the support, the captive bracket comprising a fixing bolt extending inwardly from a tree-facing side of the captive bracket, the fixing bolt configured to be receivable by each of the plurality of openings when the fixing bolt is aligned with each opening, wherein the fixing bolt being received by an opening fixes the captive bracket to the support and sets the angle between the support and the platform.

11. The mechanism of claim 10, wherein the angle between the support and the platform is adjustable between three degrees above a horizontal and 12 degrees below a horizontal.

12. The mechanism of claim 10, the support comprising a generally rectangular cross section, with an outer side opposed from the tree-facing side and right and left sides.

13. The mechanism of claim 10, the captive bracket comprising a substantially U-shaped bracket with an open end enclosed by an upper transverse bolt and a lower transverse bolt, the upper transverse bolt and the lower transverse bolt each extending between opposed sides of the bracket.

14. The mechanism of claim 13, the lower transverse bolt spaced inwardly from the upper transverse bolt.

15. The mechanism of claim 14, the lower transverse bolt spaced below the upper transverse bolt.

16. The mechanism of claim 15, the fixing bolt and the upper transverse bolt lying in the same general horizontal plane.

17. The mechanism of claim 10, the captive bracket adjustable on the support by rocking the captive bracket downward and towards the tree until the fixing bolt is removed from the support, then sliding the bracket upwards or downwards on the support.

18. The mechanism of claim 10, further comprising support cables extending between the platform and the captive bracket.

19. The mechanism of claim 18, the support cables comprising two cables, the cables extending between opposed ends of the upper transverse bolt and opposed sides of the platform.

20. A treestand platform adjustment mechanism coupled to and in combination with a tree, for adjustably angling a platform in relation to the tree, the mechanism comprising:

a support rotatably affixed to a platform, an angle between the support and the platform adjustable by adjusting a captive bracket that is slideably engaged with the support, the support comprising a plurality of openings extending generally horizontally through the support, the openings vertically spaced-apart from one another on a tree-facing side of the support, the tree-facing side of the support facing the tree;

the captive bracket comprising a fixing bolt extending inwardly from a tree-facing side of the captive bracket, the fixing bolt receivable by each of the plurality of openings when the fixing bolt is aligned with each opening, wherein the fixing bolt being received by an opening fixes the captive bracket to the support and sets the angle between the support and the platform.

* * * * *